United States Patent [19]

Eddy

[11] Patent Number: 5,356,110
[45] Date of Patent: Oct. 18, 1994

[54] PNEUMATIC ISOLATION SYSTEMS FOR DAMPING VERTICAL, HORIZONTAL AND ROTATIONAL VIBRATIONS

[75] Inventor: Richard P. Eddy, Gardena, Calif.

[73] Assignee: Newport Corporation, Irvine, Calif.

[21] Appl. No.: 73,933

[22] Filed: Jun. 8, 1993

[51] Int. Cl.$^5$ .................................. F16M 13/00
[52] U.S. Cl. .................... 248/550; 108/136; 248/631; 248/636; 248/638
[58] Field of Search ........... 248/638, 550, 636, 562, 248/631; 108/136; 267/140.11, 140.14, 140.15, 140.13

[56] References Cited

U.S. PATENT DOCUMENTS

| | | |
|---|---|---|
| 2,770,434 | 11/1956 | McNally . |
| 3,008,703 | 11/1961 | Slemmons ................ 248/631 X |
| 3,282,542 | 11/1966 | Goodwin et al. . |
| 3,578,278 | 5/1971 | Pickering . |
| 3,589,655 | 6/1971 | Hackbarth ............... 248/631 X |
| 3,598,353 | 8/1971 | De Grey ................... 248/631 |
| 3,627,246 | 12/1971 | Widding . |
| 3,667,707 | 6/1972 | Mui ........................... 248/631 X |
| 3,730,473 | 5/1973 | Pepi . |
| 3,749,339 | 7/1973 | Avedissian ............... 248/631 X |
| 3,784,146 | 1/1974 | Matthews . |
| 3,889,936 | 6/1975 | Shimizu . |
| 3,917,201 | 11/1975 | Roll ............................ 248/550 |
| 3,949,961 | 4/1976 | Pamer . |
| 3,989,232 | 11/1976 | Steinbach et al. . |
| 4,147,319 | 4/1979 | Tsybulnik .................. 248/638 |
| 4,223,762 | 9/1980 | Gertal . |
| 4,360,184 | 11/1982 | Reid III . |
| 4,655,440 | 4/1987 | Eckert . |
| 4,690,388 | 9/1987 | Harrison .................. 248/631 X |
| 4,730,541 | 3/1988 | Greene ..................... 248/550 X |
| 4,743,000 | 5/1988 | Karnopp . |
| 4,815,716 | 3/1989 | Scotto . |
| 5,071,108 | 12/1991 | Houghton, Jr. . |

FOREIGN PATENT DOCUMENTS

| | | |
|---|---|---|
| 629690 | 7/1963 | Belgium . |
| 357245 | 3/1990 | European Pat. Off. ....... 267/140.11 |
| 2344570 | 4/1974 | Fed. Rep. of Germany . |
| 3908718 | 9/1989 | Fed. Rep. of Germany ................ 267/140.11 |
| 2-26334 | 1/1990 | Japan . |
| 4-157225 | 5/1992 | Japan ...................... 267/140.11 |
| 1293402 | 2/1987 | U.S.S.R. . |
| 2241043 | 8/1991 | United Kingdom . |

OTHER PUBLICATIONS

"Design of Laminar Flow Restrictors for Damping Pneumatic Vibration Isolators," Daniel B. DeBra, CIRP 34th General Assembly, (Aug. 1984).
Newport Catalog (Newport Corporation, 1989).
"The Analysis and Design of Pneumatic Systems," by Dr. Blaine W. Andersen (John Wiley 1967).
Visolator Vibration Isolation Breedboard (Photographs) Pre Jan. 1990.
Clippard Instrument Laboratories, Catalog 189 (1989).

Primary Examiner—J. Franklin Foss
Attorney, Agent, or Firm—Benoit Law Corporation

[57] ABSTRACT

Methods and apparatus for isolating a load structure from vertical, horizontal and rotational vibrations of a supporting structure operate with the aid of displacement of a pneumatic fluid from and to a fluid chamber of a pneumatic vibration isolation system. A fluid-tight diaphragm extends from a circumferential edge of the fluid chamber into that fluid chamber, and has a circumferential compliance section inside that edge of the fluid chamber. The diaphragm is structured inside of that compliance section with alternate stiffened and reinforced diaphragm portions in the fluid chamber. The diaphragm and the fluid chamber are coupled between the supporting structure and the load structure. Vertical vibrations are damped by displacing pneumatic fluid from and to the fluid chamber with the fluid-tight diaphragm and horizontal and rotational vibrations are damped with the reinforced diaphragm portion in the fluid chamber.

29 Claims, 5 Drawing Sheets

PNEUMATIC ISOLATION SYSTEMS FOR DAMPING VERTICAL, HORIZONTAL AND ROTATIONAL VIBRATIONS

FIELD OF THE INVENTION

The subject invention relates to pneumatic vibration isolation systems, methods, apparatus and components and, more specifically to pneumatic vibration isolation systems capable of isolating or damping vertical, horizontal and rotational components of vibration.

BACKGROUND OF THE INVENTION

For an introduction of pneumatic vibration isolation systems, reference may be had to a paper by Professor Daniel B. DeBra, entitled "Design of Laminar Flow Restrictors for Damping Pneumatic Vibration Isolators" (CIPR 34th General Assembly, August 1984).

In particular, FIG. 5 of that article and its accompanying text illustrate and describe the typical pneumatic vibration isolator. As shown in U.S. Pat. No. 3,627,246, by Fred B. Widding, issued Dec. 14, 1971 for "Isolating Leg Structure for Tables and the Like," such pneumatic vibration isolators use a rolling diaphragm which extends over or at least between the piston and a circular edge of the compliance or spring chamber.

In that classical approach to pneumatic vibration isolation, almost the entire pressure load is supported by the piston head, and only a small amount of the pneumatic pressure is supported by the necessarily narrow convolution of the circumferential rolling or compliance section of the diaphragm. Horizontal pressure components acting on a cylindrical side of: the piston on the one hand and on an adjacent wall of an annular diaphragm mount or clamp on the other hand act in opposition and thereby cancel each other out. The vertical pressure components appear as a normal pressure on the projection of the small semicircularly shaped segment of the rolling diaphragm convolution. Even the sum of such vertical pressure components around the piston is small, such as on the order of two percent of the total pressure on the piston head or on the part of the diaphragm carried by or carrying the piston head.

The function of such rolling diaphragm in prior-art vibration isolators thus was and is to separate the piston from the top or bottom section of the adjacent pneumatic chamber, as the case may be.

Also, the classical vibration isolator typified in the above mentioned FIG. 5 of Professor DeBra's article, was and is oriented in terms of vertical vibration isolation, with some horizontal vibration isolation being provided by the flexible rubber sheeting of prior-art diaphragms.

However, as pointed out in U.S. Pat. No. 3,784,146, by Dr. John W. Matthews, issued Jan. 8, 1974 for "Horizontal Vibration Isolation System," col. 1, lines 26 to 30:

"Attempts to make such a diaphragm system more effective with horizontal vibrations have either resulted in reduced performance in the vertical direction or in poor stability in the horizontal direction."

Accordingly, that pivotal Matthews patent provided the piston with an internal cable suspension system that has been leading technology for pneumatic vibration isolation systems for isolating loads from vertical and horizontal vibrations.

Other approaches to the problem are apparent from U.S. Pat. No. 4,360,184, by Willis J. Reid, III, issued Nov. 23, 1982 for "Pneumatic Device for Attenuation of Vertical, Horizontal and Rotational Dynamic Forces." That approach retained the classical piston-and-diaphragm configuration wherein the diaphragm supports only a small portion of the pneumatic pressure essentially only in the necessarily narrow convolution of the circumferential rolling section of the diaphragm, as explained above. Almost the entire pressure load is again supported by the piston head at least partially covered by the diaphragm, and by the head of a piston well for presenting a bearing surface to a load support rod. Such an extension of the load support pivot beyond the vertical roll center (VRC) of the diaphragm was designed to increase the range of vertical and horizontal vibration down to the 5 Hz area. A second embodiment provides a secondary piston with secondary diaphragm where the first embodiment provides the bearing surface.

Such prior-art approaches logically make for bulky, heavy and expensive structures. Also, their efficacy in isolating loads from rotational vibratory components is questionable.

SUMMARY OF THE INVENTION

The invention resides in methods and apparatus for isolating a load structure from vertical, horizontal and rotational vibrations of a supporting structure with the aid of displacement of a pneumatic fluid from and to a fluid chamber of a pneumatic vibration isolation system.

In method terms, the invention resides particularly in the improvement, comprising in combination, providing a fluid-tight diaphragm extending from a circumferential edge of the fluid chamber into that fluid chamber, providing that diaphragm with a circumferential compliance section inside that edge of the fluid chamber, structuring that diaphragm inside of that compliance section with alternate stiffened and reinforced diaphragm portions in the fluid chamber, coupling that diaphragm and the fluid chamber between the supporting structure and the load structure, damping vertical vibrations by displacing pneumatic fluid from and to the fluid chamber with the fluid-tight diaphragm and damping horizontal and rotational vibrations with the reinforced diaphragm portion in the fluid chamber.

In apparatus terms, the invention resides in the improvement comprising, in combination, a fluid-tight diaphragm extending from a circumferential edge of the fluid chamber into that fluid chamber, such diaphragm having a circumferential compliance section inside that edge of the fluid chamber, and such diaphragm having a vertical vibrations damping section and a horizontal and rotational vibrations damping section inside of its compliance section in the form of alternate stiffened and reinforced diaphragm portions in the fluid chamber, and such diaphragm and fluid chamber being adapted to be coupled between the supporting structure and the load structure, whereby vertical vibrations are dampened by displacing pneumatic fluid from and to the fluid chamber with the diaphragm including the stiffened diaphragm portion of the vertical vibrations damping section, and horizontal and rotational vibrations are dampened with the reinforced diaphragm portion including the horizontal vibrations damping section in the fluid chamber.

From another aspect thereof the invention resides in the improvement comprising, in combination, a diaphragm support extending from outside the fluid chamber and past a circumferential edge of that fluid chamber into that fluid chamber, a fluid-tight diaphragm extending from the circumferential edge of the fluid chamber onto the diaphragm support in that fluid chamber; such fluid-tight diaphragm having an annular compliance section at the circumferential edge, and the diaphragm including a reinforced diaphragm portion around and in spaced relationship to the diaphragm support and inside of the annular compliance section, and the diaphragm having an annular stiffened diaphragm portion between the reinforced diaphragm portion and the annular compliance section.

The reinforced diaphragm portion preferably has a catenary shape.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

The following is a written description of the invention in the context of the accompanying drawings and of embodiments thereof.

Figure 1:
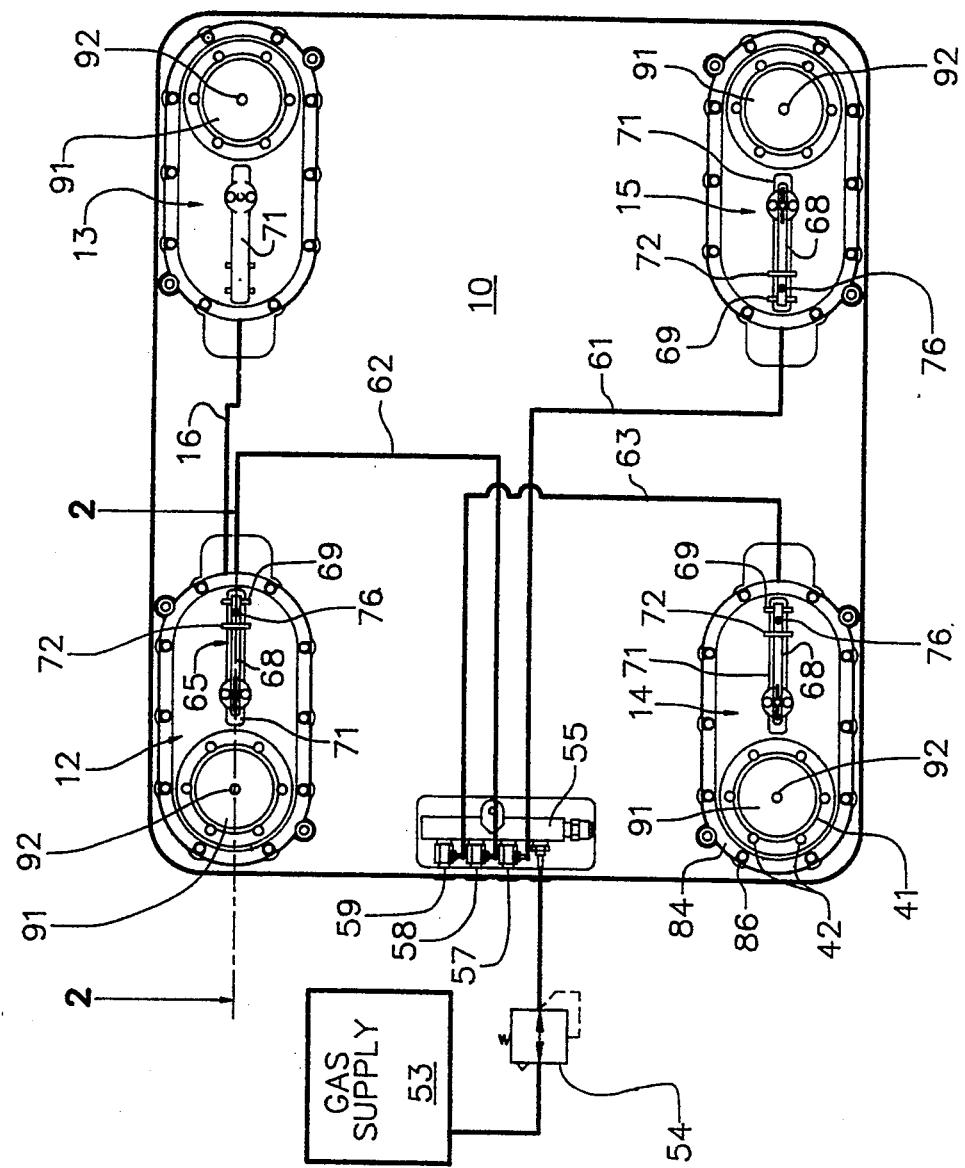
FIG. 1 is a bottom view in section with diagrammatic showings of a pneumatic vibration isolation system according to an embodiment of the invention.
Figure 2:
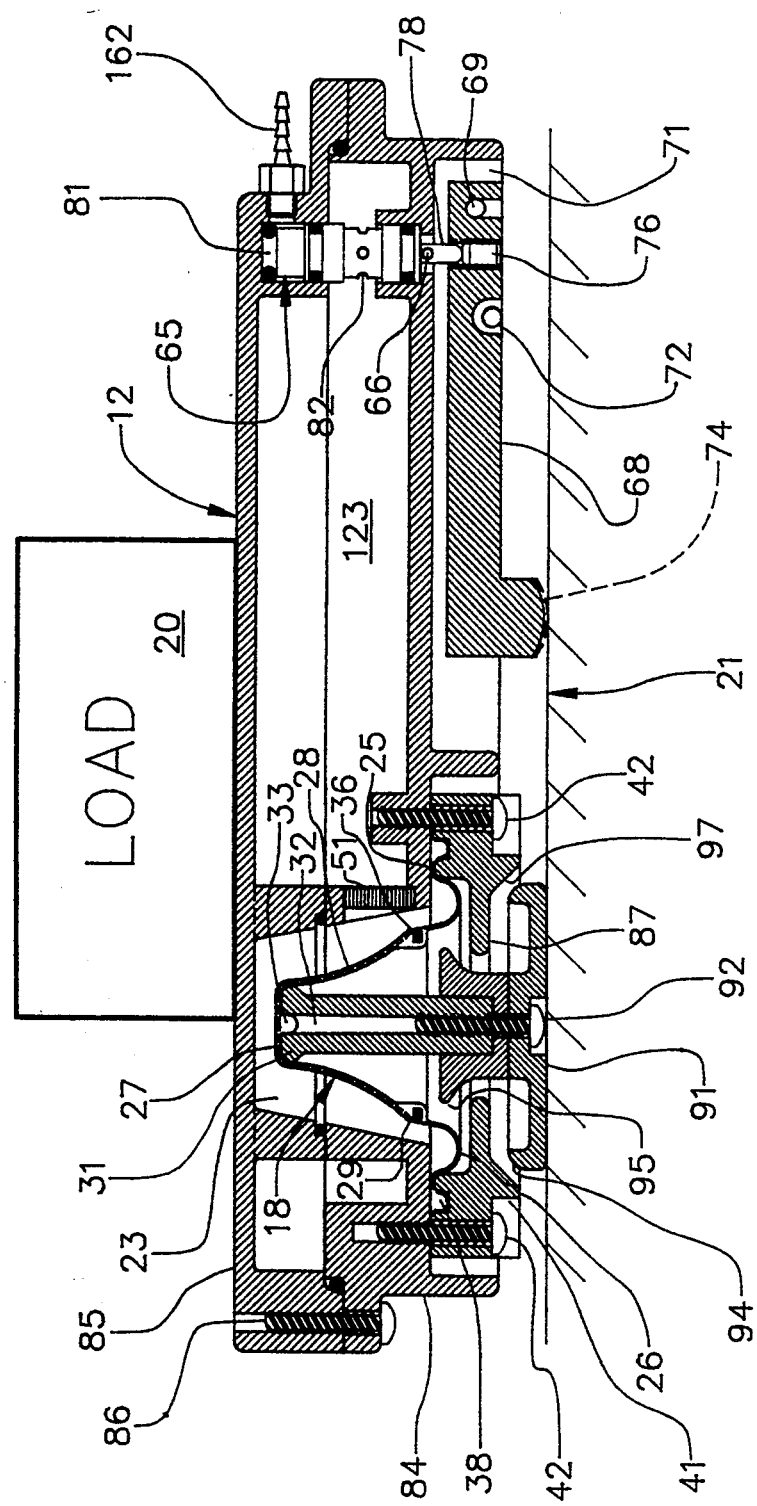
FIG. 2 is a sectional side view, on an enlarged scale, of a component of the structure shown in FIG. 1, taken on the line 2—2 in FIG. 2.

FIG. 1 shows a pneumatic vibration isolation platform 10 including vibration isolated modules 12, 14, 14 and 15. To avoid needless repetition, only one of the modules 12 is shown in FIG. 2 and is described in detail, but it is understood that the other modules and their operation may be the same if not more than three modules are used in a given application. Where four or more modules are used, not every module is provided with a leveling valve.

For instance, as seen in FIG. 1, the isolator 13 does not have a leveling valve (well 71 empty), but is a slave to the leveling valve 12 which controls it through a separate interconnecting fluid line 16.

The platform 10 may be a table top or a bench top incorporating the four isolator modules 12 to 15 recessed into the bottom of the platform. By way of example, the platform 10 may be a plastic laminate having recesses for receiving the four isolator modules. Ferromagnetic stainless steel and other work surfaces are alternatives for the platform or table top, with or without sealed mounting holes.

Each module contains a pneumatic, flexible rolling diaphragm 18 that supports the load, decoupling vertical, horizontal and rotational vibrations from the isolated platform 10.

The drawings not only show structure, but also illustrate methods and apparatus for isolating a load structure 20 from vibrations of a supporting structure 21 with the aid of displacement of a pneumatic fluid from and to a fluid chamber 23 of pneumatic vibration isolation system.

As apparent from FIG. 1, what is shown as load 20 in FIG. 2 may include the platform structure 10, as well as a payload or external component which is located thereon and which is to be isolated from vibrations of the floor or other structure 21 on which the modules 12 to 15 are supported.

As the expression "with the aid of" is intended to imply, there may be other conventional means, such as those described below, and other isolator modules or isolators of the type or kind herein described, such as three identical assemblies, with or without one or more slave modules, for supporting and isolating the load from vibrations. Accordingly, expressions such as "the diaphragm" and "the fluid chamber" or the like in the disclosure herein may be interpreted as "each diaphragm" and "each fluid chamber" or the like, as the case and utility may be.

The invention provides a fluid-tight diaphragm 18 extending from a circumferential edge 25 of the fluid chamber into that fluid chamber 23, and provides that diaphragm with a circumferential compliance section 26 inside the edge 25 of the fluid chamber. In combination with these features, the invention structures the diaphragm 18 inside of its compliance section 26 with alternate stiffened and reinforced diaphragm portions in the fluid chamber 23.

Figure 3:
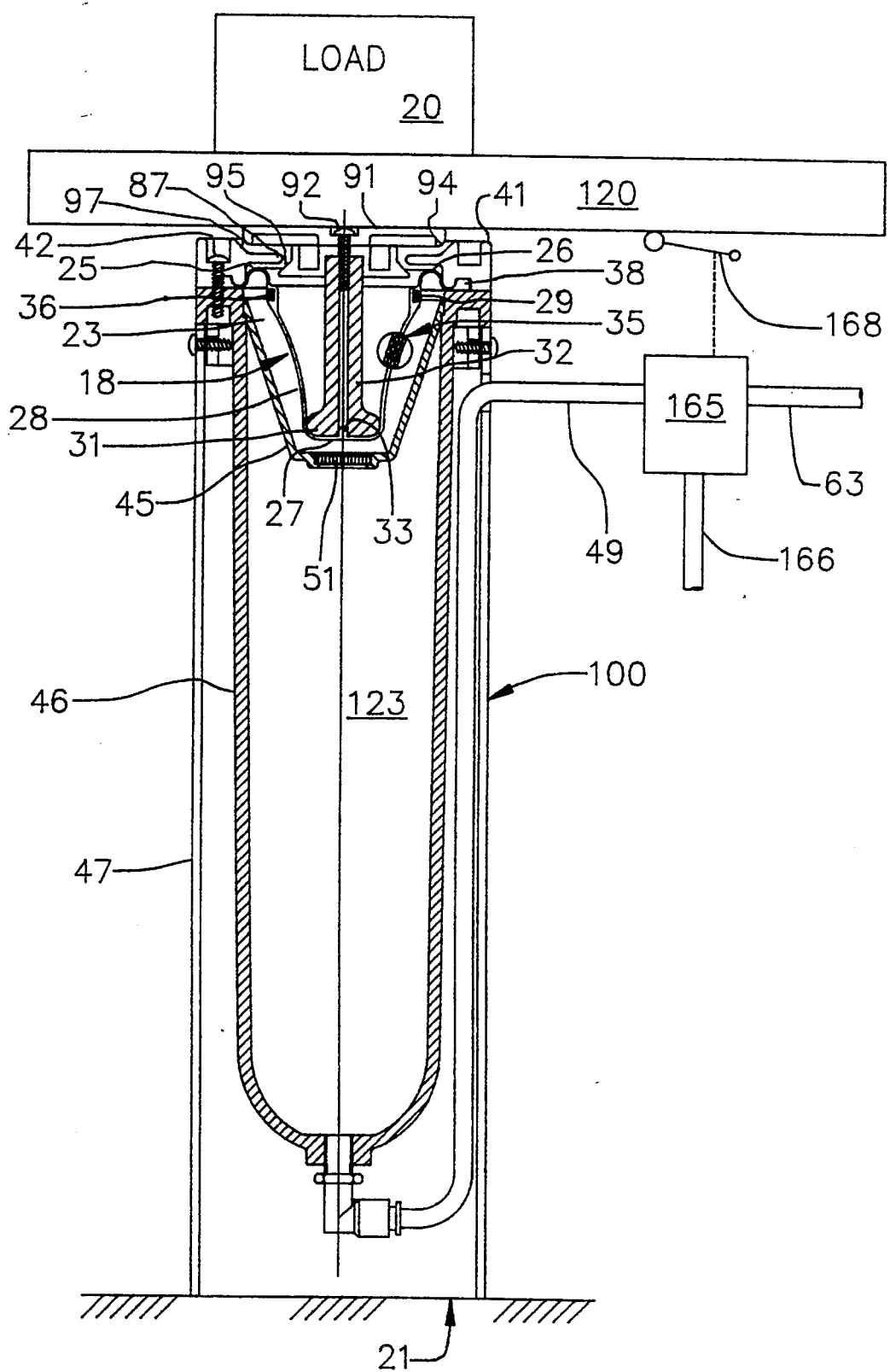
FIG. 3 is an elevation, in section, of a pneumatic vibration isolator or table leg according to another embodiment of the invention.

As seen in the illustrated embodiment of FIGS. 2 and 3, the fluid chamber 23 is provided around the fluid-tight diaphragm 18, or such fluid-tight diaphragm is inside that fluid chamber. Conversely, the fluid-tight diaphragm has an inside open to atmosphere, such as through the gaps between the stop 87 and foot sections 94 and 95 as seen in FIGS. 2 and 3. As further seen in FIG. 3, the fluid chamber 23 is provided with a wall 45 encompassing the fluid-tight diaphragm 18, and such wall is spaced all around the alternate stiffened and reinforced diaphragm portions.

By way of preferred embodiment, FIGS. 2 and 3 show the diaphragm 18 with alternate stiffened, reinforced, and stiffened diaphragm portions 27, 28, and 29, respectively. Such portions 27, 28 and 29 may be formed externally or internally of the diaphragm 18.

The illustrated preferred embodiment of the invention shows the first diaphragm portion 27 stiffened by a diaphragm stiffener or support 31 over which the diaphragm is draped. That support may have a central cavity or bore 32 and the diaphragm may have a central inward projection 33 adapted to project or projecting into that cavity or bore 32. The diaphragm 18 may thus be retained on the stiffener or support 31, or such support may be retained at the diaphragm portion to stiffen that portion 27 of the otherwise mostly flexible diaphragm 18.

The special diaphragm according to the preferred embodiment of the invention may be made by different ways and means. By way of example, the diaphragm 18 may be made of natural or synthetic rubber, such as nitrile rubber, or of another pressure resistant and thermally stable elastomer. Such rubber or other elastomer may be reinforced with one or more plies of a fabric, preferably of Nylon or Dacron.

The thickness of the diaphragm is less in its compliance section 26 than in its other sections. By comparison, if the minimum thickness of the diaphragm 18 in the stiffened section 29 or reinforced portion 28 is more than half a millimeter, then the diaphragm thickness in its compliance or vertical roll section 26 is less than half a millimeter.

The reinforced portion 28 may be formed internally of the diaphragm. In this respect, FIG. 3 shows several plies of diaphragm structure in a magnified detail section 35. Such multiple plies form the reinforced diaphragm portion 28 circumferentially around the support 31 between the spaced stiffened diaphragm portions 27 and 29. The multiply diaphragm structure 35 may also extend throughout the central diaphragm portion 27 which, however, is not just reinforced, but unlike the intermediate portion 28, is stiffened by the support or stiffener 31.

The multiply diaphragm structure 35 may also extend from the intermediate portion 28 into the annular stiffened portion 29. Preferably, such multiple plies should extend on the pressure side or outside of the annular stiffener 36. Again, the region at the stiffener 36 is not just a reinforced portion, it is a stiffened diaphragm portion.

The annular stiffener 36 may be in the form of an embedded ring of aluminum or of another metal or rigid material. The multiply reinforced diaphragm portion 35, does not, however, extend through the compliance section 26. Rather in order to preserve the suppleness of the rolling compliance section 26, it is preferred that only one ply of the diaphragm structure extend circumferentially through the compliance section 26 of the preferably integral diaphragm 18.

The diaphragm 18 preferably has a thickened or beaded flange 38 clamped to an edge 25 of the fluid chamber 23 by an annular clamping structure 41 releasably attached by fasteners 42.

The diaphragm 18 and the fluid chamber 23 are coupled between the supporting structure 21 and the load structure 20, such as in the manner shown in FIGS. 1 and 2 or in the manner shown in FIG. 3. In this respect, FIGS. 1 and 2 show direct coupling of the diaphragm to the vibratory supporting structure 21, and FIG. 3 shows direct coupling of such diaphragm 18 to the load structure 20 or to the table 120 being part of such load structure or supporting the load isolated from vibrations.

As more fully disclosed below, the invention dampens vertical vibrations by displacing pneumatic fluid from and to the fluid chamber 23 with the fluid-tight diaphragm 18, and dampens horizontal and rotational vibrations with the reinforced diaphragm portion 28 in the fluid chamber.

In apparatus terms, the diaphragm 18 according to the illustrated embodiments of the invention has a vertical vibrations damping section inside of its compliance section 26 in the form of alternate stiffened and reinforced diaphragm portions 28, 29 in the fluid chamber 23, whereby vertical vibrations are dampened by displacing pneumatic fluid from and to the fluid chamber 23 with the diaphragm 18 including the stiffened diaphragm portion 27 of the vertical vibrations damping section, and horizontal and rotational vibrations are dampened with the reinforced diaphragm portion 28 including the horizontal and rotational vibrations damping section in that fluid chamber 23.

An initial structure of the structured diaphragm 18 is substantially maintained with the stiffened diaphragm portions 27 and 29, except for variations due to and during damping of vibrations with the alternate stiffened and reinforced diaphragm portions 27, 28, 29.

As may be noted from the sectional view of FIGS. 2 and 3, the manufacture of structuring of the diaphragm according to a preferred embodiment of the invention includes imposing a catenary shape on the reinforced diaphragm portion 28 for damping horizontal and rotational vibrations in the fluid chamber 23. In structural terms, the horizontal and rotational vibration damping section of the diaphragm 18 includes a reinforced diaphragm portion 28 of a catenary shape, such as shown in FIGS. 2 to 6.

During operation of the vibration isolator, such catenary shape of the reinforced diaphragm portion 28 is maintained with the stiffened diaphragm portions 27 and 29, except for variations due to and during damping of vibrations with the alternate stiffened and reinforced diaphragm portions 27, 28, 29.

In practice, this optimizes horizontal, rotational and vertical vibration isolation and requisite diaphragm flexing for this purpose.

Figure 4:
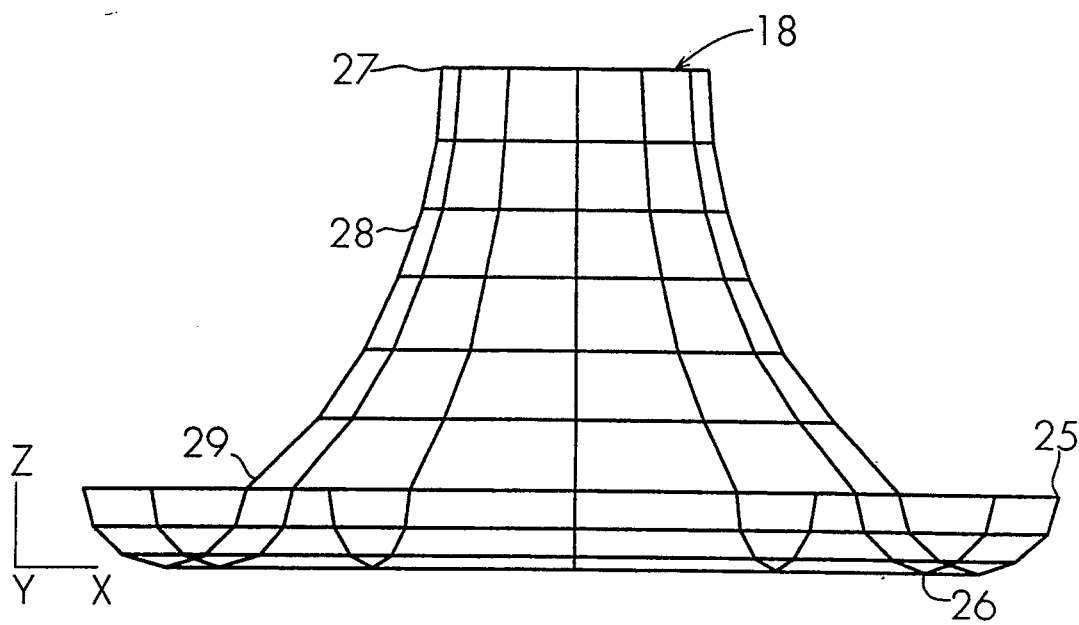
FIG. 4 is a side view of a computerized representation of a special diaphragm used in the systems of FIGS. 1, 2, and 3 according to an embodiment of the invention.
Figure 5:
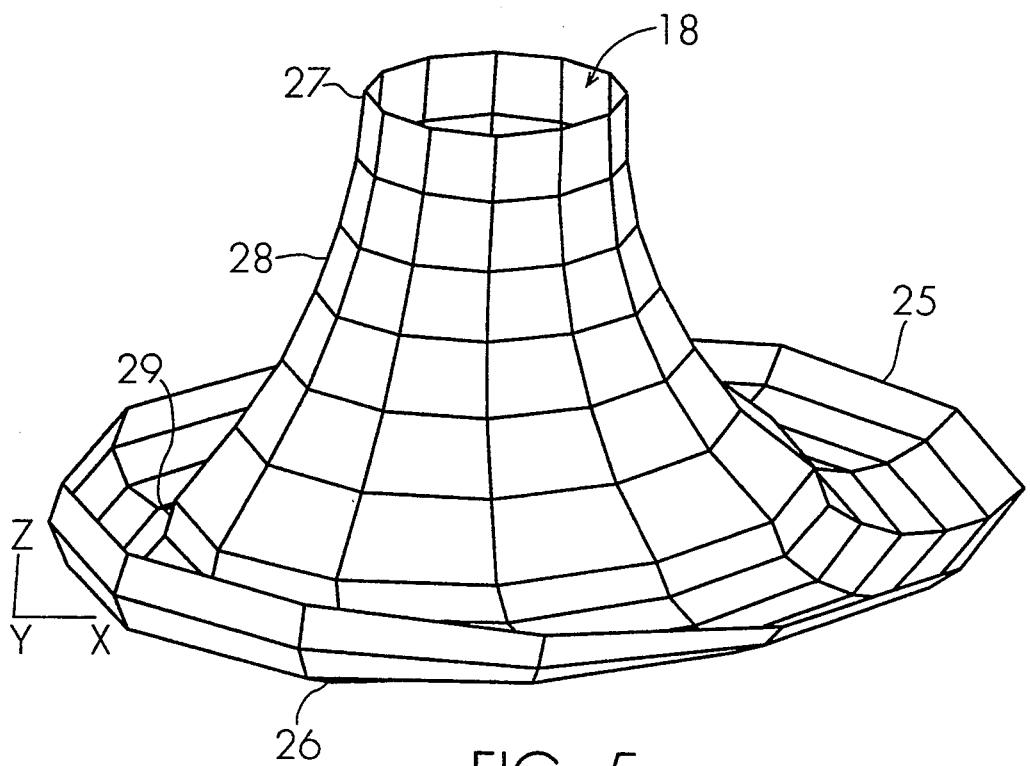
FIG. 5 is a perspective view of the diaphragm representation depicted in FIG. 3, but in an operating state and with nodal points indicating function.
Figure 6:
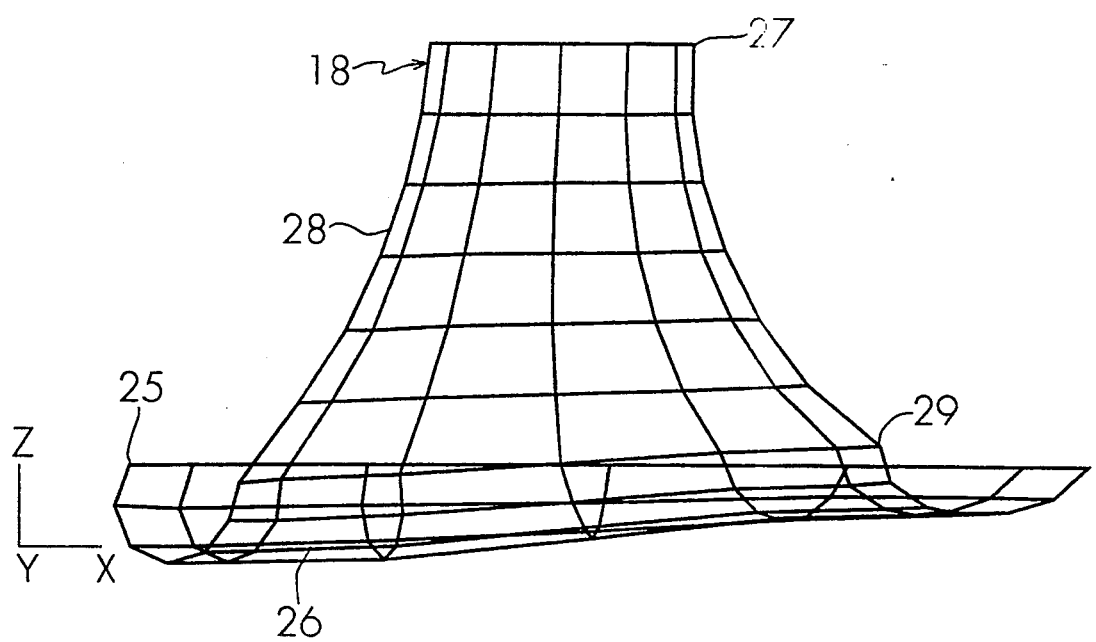
FIG. 6 is a view similar to FIG. 4 but depicting a further deflection of the diaphragm in a damping of horizontal vibrations according to an embodiment of the invention.

To illustrate this and other modes of omnidirectional isolation according to a preferred embodiment of the invention, FIGS. 4 to 6 show computerized contour plots of nodal points on the shaped and partially reinforced diaphragm 18 of FIGS. 2 and 3. This showing is known as a "wireframe" in the art of computerized analysis.

FIG. 4 is such a "wireframe" representation for the fluidtight diaphragm 18 at rest. Vibrations impose stress, strain and motion on various parts of the diaphragm. This is shown perspectively in FIG. 5 where the nodal points on the diaphragm 18 are also shown.

In operation, the ring 36 of metal or rigid material will not stretch, and the diaphragm is circumferentially damped at 25.

However, the diaphragm stretches and bends considerably in response vibrations, especially in the compliance section 26 which is stretched and bent differently around its circumference in response to horizontal vibration components in different directions. The stiff ring 36 prevents a collapse of the flexible diaphragm, but portions of the reinforced diaphragm section 28 above such ring stretch, bend and twist so as to absorb horizontal and rotational vibration components as may be seen from FIGS. 5 and 6 depicting angular deflections and lateral distortions of the diaphragm 18 during vibration isolation.

The substantially catenary diaphragm 18 thus twists and shakes to and fro omnidirectionally relative to the diaphragm support 31, thereby absorbing or attenuating rotational and horizontal vibration components x-y also through interaction with the damping fluid in the chamber 23, while the stiffened portion 27 and to some extent also the diagram's reinforced section 28 attenuate vertical vibration components z through interaction with and displacement of the damping fluid in and from that chamber 23.

Especially from FIG. 5 it may be noted that the invention extends to structures in which the diaphragm extends circumferentially around the diaphragm support 31 without necessarily extending over the top of that diaphragm support. Of course, the diaphragm 18 would then at its upper edge at 27 be intimately attached or bonded to the diaphragm support 31 to constitute the same in effect as a stiffened diaphragm portion 27 for damping vertical vibrations.

While a catenary shape is preferred, the diaphragm structuring within the scope of the invention includes imposing on the diaphragm 18 a bell shape having a circumferential rim inside of the circumferential compliance section 26 established and maintained by one of said stiffened diaphragm portions, such as the portion 29, and having a central portion established and maintained by another stiffened diaphragm portion 27, and having the reinforced diaphragm portion 28 for damping horizontal and rotational vibrations located between the one and the other stiffened diaphragm portions 29 and 27. The diaphragm is coupled to one of the load structure and the supporting structure 20 or 21 via the central portion 27 of that diaphragm 18.

Put differently, the diaphragm 18 has a bell shape including a circumferential rim 29 inside of its circumferential compliance section 26 at one of the stiffened diaphragm portions, and including in its vertical vibrations damping section a central stiffened diaphragm portion 27, and having the reinforced diaphragm portion 28 located between that central portion and the circumferential rim.

In structural terms, the diaphragm 18 and the fluid chamber 23 are adapted to be coupled between the supporting structure 21 and the load structure 20. According to the illustrated embodiment, such coupling includes the diaphragm support 31 for stiffening the central portion 27 of the diaphragm; such diaphragm support being extended from the central portion 27 inside the fluid chamber 23 and past its circumferential edge 25 to an outside of that fluid chamber for coupling the diaphragm 18 to one of the load structure and said supporting structure, such as to the supporting structure 21 in FIG. 2 or to the load structure 120 in FIG. 3.

Put differently, the vertical vibrations damping section 27 includes a diaphragm support 31 extending from a central portion of said diaphragm 18 inside the fluid chamber and past the circumferential edge 25 to an outside of that fluid chamber 23 and being adapted to couple that diaphragm to one of said load structure and said supporting structure.

The reinforced diaphragm portion 28 for damping horizontal and rotational vibrations is structured around and circumferentially spaced from the diaphragm support 31. According to the illustrated embodiments of the invention, the reinforced diaphragm portion 28 for damping horizontal and rotational vibrations is structured around and is maintained circumferentially spaced from the diaphragm support 31 with a stiffened annular portion 29 of the diaphragm 18 inside of its circumferential compliance section 26.

From a different aspect thereof, the invention resides in the improvement comprising, in combination, a diaphragm support 31 extending from outside the fluid chamber and past the circumferential edge 25 into that fluid chamber 23, the fluid-tight diaphragm 18 extending from the circumferential edge 25 of the fluid chamber onto the diaphragm support 31 in the fluid chamber 23, such fluid-tight diaphragm having an annular compliance section 26 at the circumferential edge 25, and such diaphragm including a reinforced diaphragm portion 28 around and in spaced relationship to the diaphragm support 31 and inside of the annular compliance section 26, and such diaphragm 18 having an annular stiffened diaphragm portion 29 between the reinforced diaphragm portion 28 and said annular compliance section 26. The reinforced diaphragm portion 28 preferably has a catenary shape.

The diaphragm may be draped over the diaphragm support 31 at the central portion 27 of that diaphragm 18, with the reinforced diaphragm portion 28 for damping horizontal and rotational vibrations extending in circumferentially spaced relationship to the diaphragm support 31, but inside of the circumferential compliance section 26. A stiffened diaphragm section 29 is interposed between the circumferential compliance section 26 and the reinforced diaphragm portion 28 for damping horizontal and rotational vibrations.

The expression "pneumatic vibration isolation system" as herein employed implies, of course, everything necessary, including conventional parts, components and means, to make the system work as disclosed.

The pneumatic fluid chamber 23 has already been mentioned and may be considered as a first fluid chamber. There also is a second fluid chamber 123 separate from both the operating diaphragm 18 and the first pneumatic chamber 23. The first fluid chamber 23 may, for example, be provided as a frustoconical cavity inside the second fluid chamber. That second fluid chamber 123 may be formed by cavities around the first chamber 23 as in the vibration isolator module 12 to 15 in FIGS. 1 and 2.

Alternatively, the first fluid chamber 23 may be formed by a pressure barrier 45 projecting into a vessel 46 forming the second fluid chamber 123, as in FIG. 3. That vessel 46 is mounted on and extends into a hollow cylindrical leg 47 of the vibration isolator 100 shown in FIG. 3. The annular diaphragm clamp 41 is mounted on top of the vessel 46 by fasteners 42. The vibration isolator 100 has a gas inlet 49 leading to the bottom and to the inside of the vessel 46 or fluid chamber 123.

In practice, there may be three or more of the vibration isolators 100 for a given application, and they may be distributed and supplied with gas as shown for the isolator modules 12 to 15 in FIG. 1.

A gas flow restrictor 51 may be provided between the first and second pneumatic chambers 23 and 123. In this respect, within the scope of the invention, such gas flow passage may be provided internally or externally of the vibration isolation structure, and may even be made variable.

Pursuant to a preferred embodiment of the invention, a laminar gas flow restrictor is provided at 51 between the first and second pneumatic chambers, and the operation of the pneumatic vibration isolation system includes laminar gas flow through that restrictor between the first and second pneumatic chambers 23 and 123.

By way of example, laminar flow restrictors of the type disclosed by Daniel B. DeBra, in his above mentioned article entitled "Design of Laminar Flow Restrictors for Pneumatic Vibration Isolators" (CIPR 34th General Assembly, August 1984) may be employed at 51. Alternatively, porous sintered metal elements or other flow restrictors with manifold gas passages therethrough may be used at 51.

When choosing or designing the flow restrictor 51, two completely different types of phenomena should be considered. One is low frequency-high amplitude vibrations in which gas is made to pass through the restrictor at displacements and frequencies anticipated during isolation and re-positioning. Standard mass flow considerations may be used in this respect. The other phenomenon concerns low amplitude-high frequency vibrations experienced during isolation where energy is conducted on a molecular-level in the form of acoustic waves. The gas does not actually-pass through the restrictor in that mode; only the energy passes through in molecular wave motion.

A porous filter type of laminar flow restrictor is preferably chosen to ensure that the resistance to flow at the low frequency-high amplitude mode will vary linearly with the expected velocities of the gas through the restrictor. The significant advantage of using the porous filter type of laminar flow restrictor is that for small amplitude-high frequency ground motions, the gas molecules do not actually pass through the porous filters. There is then no mass flow through the filters and the barrier between first and second chambers with filter orifices or restrictors appears transparent to the acoustic pressure waves. This means that, with a sufficient area of material, the motion transmitted from the ground or bottom structure 21 presents no direct coupling between ground or structure 21 to the load 20 isolated by the vibration isolator system. The traditional hole or orifice type of flow restrictor will not provide this degree of transparency to the pressure waves, but may be used alternatively within the scope of the invention for less demanding requirements.

Two or more gas passages may be provided in parallel between chambers 23 and 123.

The first and second pneumatic chambers 23 and 123 are supplied or initially charged with gas. The most widely used gas for vibration isolation purposes is air, but the expression "gas" as herein employed is intended to be sufficiently broad to cover other compressible fluids, such as gases other than air. The expressions "gas" and "pneumatic" are herein used as terms of convenience on the one hand, and as indicative of the currently preferred media on the other hand.

Gas may be applied from a pump, reservoir or other supply 53, such as via a pressure regulator shown by its standard symbol at 54 and having an outlet connected to a manifold 55. That manifold has three outlets with needle valves or other variable flow restrictors 57, 58 and 59 connected thereto. These restrictors have outlets individually connected to gas lines 61, 62 and 63, respectively, leading in FIG. 1 to modules 12, 14 and 15. As already mentioned above, module 13 is a slave of module 12 and is connected thereto by the gas line 16, whereby the same level control valve 65 serves both modules 12 and 13.

FIG. 2 shows an inlet fitting 162 for receiving the gas line 62 shown in FIG. 1 and thereby the gas supply for the module 12. The remaining modules 14 and 15 are similarly supplied with gas via lines 63 and 61, respectively.

Generally speaking, the gas supply 53 is connected to the first and second pneumatic chambers 23 and 123, albeit not all the time. An actuable gas exhaust 66 may be included in the level control valve 65.

In the case of air, that exhaust may be simply an exhaust to atmosphere. In the case of a valuable gas or other fluid, the exhaust may lead back to the pressure supply 53 for recycling.

However, as shown in the embodiment illustrated in FIGS. 1 and 2, valve 65 is a level control valve or leveling valve for continually restoring a level or position of the platform 10. That level control valve has a platform height or level sensor lever 68 pivoted at a pivot pin 69 attached to the module in a well 71. A stop 72 is also attached to the module and delimits the lower end of the range of motion of the sensing lever 68.

The lever 68 may be biased downwardly by or with the aid of gravity to engage and to remain in engagement with the surface of the floor or supporting structure 21, as indicated by the dotted outline 74.

In this respect and in general, the vibration isolation platform 10 may be a bench top unit or table top unit, and the supporting structure 21 may be a table.

The level control valve 65 may be a conventional poppet-type valve, admitting gas from the inlet 162 to the chamber 123 when the vibration isolation platform 10 moves downwardly, causing the sensing lever 68 to move upwardly, or permitting gas from the chamber 123 to exhaust through opening 66 when the platform 10 is too high so that the sensing lever 68 is lower than as shown in FIG. 2 relative to that vibration isolation platform 10.

Operation of the level control valve 65 may be adjusted with a set screw 76 acting on the valve stem 78.

Of course, various pneumatic level control valves are well known for various pneumatic vibration isolator systems and applications. By way of example, the valve 65 shown in FIG. 2 may be the three-way poppet valve Type MAV-3C, by Clippard Instrument Laboratory, Inc. Cincinnati, Ohio 45239, shown in their Catalog 189 (1989), on page 7. That valve has its gas inlet at 81, gas outlet at 82, and its exhaust 66 in its hollow stem 78, which is spring biased so that the valve is normally closed.

The embodiment shown in FIG. 3 also has a leveling valve 165 with a sensing lever 168 picking up the height of the vibration isolated load supporting table 120. That leveling valve has an inlet that may, for instance, be connected to a pressure-regulated gas supply line, such as shown at 63 in FIG. 1. Such leveling valve has a gas supply outlet connected to the gas supply line 49 of the vibration isolator shown in FIG. 3, and has an exhaust to atmosphere 166.

Within the broad scope of the invention, the pneumatic chamber 23 may be the spring chamber of the vibration isolation module 10 or vibration isolator 100.

As is well known, the volume of the spring chamber determines the natural frequency of the undamped pneumatic vibration isolator, such as according to the equation:

$$\omega_0 = \left\{ \frac{ngA}{V_s}\left(1 + \frac{P_a}{P_g}\right) \right\}^{\frac{1}{2}} \quad (1)$$

wherein:
$\omega_0$ is the natural frequency of the undamped system in radians per second,
n in the numerator is the polytropic gas constant,
g is acceleration due to gravity,
A is the effective cross-sectional area of the fluid-displacing portion of the diaphragm 18,
$V_s$ is the gas volume in the spring chamber,
$p_a$ is the atmospheric pressure,
$P_g$ is the gauge pressure, that is the pressure in the spring or compliance chamber above atmospheric pressure, which is dependent on the weight supported by the vibration isolator.

The mentioned n in the numerator is equal to one for low frequencies, and increases to 1.4 for high frequencies.

As those skilled in the art have recognized, Equation (1) implies a spring term, similar to the spring term in the well-known mass-spring system in mechanics. The expression "spring chamber" thus is most appropriate. Another well-known expression for the gas volume that provides the spring term of a pneumatic vibration isolator is "compliance volume," and an equally well-known expression for the chamber containing such spring-term-determining volume is "compliance chamber," in contradistinction to the damping chamber mentioned below.

However, the expressions "compliance volume" and "compliance chamber" have tended to confuse people not intimately familiar with pneumatic vibration isolation systems, since every compressible fluid, of course, has some compliance. Accordingly, while "compliance chamber" means the same as "spring chamber" it is generally better to say "spring chamber" in order to avoid such confusion.

In this respect, a vibration isolator that has a conventional damping chamber as an addition to its spring chamber is governed by the following third-order dynamic equation:

$$s(s^2+\omega_n^2)+a(1+\alpha)[s^2+\omega_n^2/(1+\omega)]=0 \quad (2)$$

wherein:
- $\omega_n$ is the natural frequency of the undamped system without the external damping chamber,
- s is the characteristic frequency of transient motion,
- $\alpha$ is the ratio of the damping chamber volume to the spring chamber volume,
- a is the characteristic frequency of the damping chamber.

The natural frequency $\omega_n$ is as given by the Equation (1) above, but modified as follows:

$$\omega_n = \omega_0(1+\alpha) \quad (3)$$

By way of example, the ratio is around 2 or 3 in a general case, although it may be higher, such as in Professor DeBra's Pneumatic Vibration Isolator disclosed in his above mentioned CIRP Paper. For $\alpha = 2$ the undamped natural frequency of the vibratory motion is $\omega_0 + 0.76\omega_n$. By comparison if the total volume is a spring volume as in the embodiment disclosed below in conjunction with Equations (10) to (17), then the frequency would be $\omega_0 = 0.58$.

However, reverting first to the alternative governed by the above Equations (2) and (3) it follows that it is primarily the gas volume, $V_s$ of the spring chamber 23 that determines the natural vibration isolation frequency of the vibration isolator, modified by interaction with the chamber 123 which in such alternative embodiment would be dimensioned as the damping chamber of the pneumatic vibrator isolator. That damping chamber is governed by the following equations:

$$q=(Q/\Delta p)(Pc^2-Pd^2)/2RT \quad (4)$$

$$pV_d/RT = p_d V_d = q \quad (5)$$

Equations (4) to (5) show that the damping chamber pressure follows changes in the spring chamber with a first order lag at the frequency "a" defined as follows:

$$a \overset{\Delta}{=} (p/V_d)(Q/\Delta p) \quad (6)$$

In these equations,
- q is mass flow through the restrictor 51,
- p is the absolute pressure in the damping chamber,
- $P_c$ is the variation of spring chamber pressure,
- $P_d$ is the variation of damping chamber pressure,
- $V_d$ is the damping chamber volume,
- Q is the volumetric gas flow rate,
- $\Delta p$ is the pressure difference at which Q is measured or calculated,
- $Q/\Delta p$ is the flow admittance,
- T the absolute gas temperature,
- R is the gas constant.

Since Equation (2) is third order in s, the motion of the supported mass or load 20 is usually characterized by a damped vibratory motion plus a first order exponential motion. The equation for maximum damping for a given $\alpha$ is $$\xi_{max}=[(1+\alpha)^{\frac{1}{2}}-1] \quad (7)$$

In terms of the natural frequency, en, defined above, maximum damping occurs when $$a=\omega_n/(1+\alpha)^{\frac{3}{2}} \quad (8)$$

The undamped natural frequency and the frequency of the first order exponential motion at maximum damping is $$\omega_0=\omega_n/(1+\alpha)^{\frac{1}{2}} \quad (9)$$

Accordingly, the diaphragm 18 vibrating in the first or spring chamber 23 can displace gas through the passage 51 into the second or damping chamber 123, whereby the vibration isolator has a damped characteristic with lowered vibration isolation frequency, such as described in Equations (2) and (6).

Pursuant to a more preferred embodiment, the total volume of all chambers 23/123 is dimensioned as spring chamber volume $V_s$ according to Equation (1). Accordingly, chambers 23/123, in-interconnected through the gas flow passage 51 now define the vibration isolation frequency of the vibration isolator 10 or 100 as substantially equal to $e_0$ pursuant to Equation (1).

In particular, by placing the frustoconical wall of the pneumatic chamber 23 and the gas flow passage or restrictor 51 as close as practical to the diaphragm 18, within the limitations of maximum diaphragm displacement and reasonable tolerancing (assume a 10% tolerance), the small enclosed volume in the now small pneumatic chamber 23 behaves as a dashpot, imparting a resisting pressure force on the diaphragm 18, which force is proportional to diagram velocity.

Performance of this preferred system may be described by the following equations. Because the total volume of gas in the two chambers 23/123 is constant, the small displacement pressure changes are related to diaphragm displacement by the equation $$V_d P_d + V_c P_c = PAz \quad (10)$$

wherein:
- $V_d$ is the damper volume in the small chamber 23,
- $P_d$ is the variation of damper pressure,
- $V_c$ is the spring compliance volume in the larger chamber 123, $P_c$ is the variation of spring compliance pressure,
p is the absolute chamber pressure,
A is the effective cross-sectional area of the diaphragm,
z is displacement of the mass or load 16 (positive downward).

A laminar mass flow through the barrier 51 is presumed to be linear with pressure difference and is given by $$q = \left(\frac{Q}{\Delta P}\right)\frac{P}{RT}(p_d - p_c) \tag{11}$$

Because of the small volume $V_d$ in the pneumatic chamber 23, it may be assumed that the volumetric flow through the restrictor 51 equals the volumetric rate of displacement provided by or relative to the diaphragm 18, as long as the gas passage provided at 51 is larger and more permeable than the conventional gas passage provided by one or two small orifices in typical prior-art vibration isolators. In equation form $$q = \rho A z \tag{12}$$

wherein:
p is the gas density $= P/RT$
The relationship of $P_c$ to z is $$(V_d + V_c)P_d = V p_d = PA(z + z/a) \tag{13}$$

wherein:

$$a = (Q/\Delta P)p/V_c \tag{14}$$

with a being the characteristic frequency of the spring chamber.

The equation of motion of the mass m without external disturbances is $$m\ddot{z} = -AP_d \tag{15}$$

From Equations (13) and (15), the characteristic equation for the currently disclosed preferred alternative of the system shown in FIGS. 1 to 3 is:

$$s^2 + (\omega_0^2/a)s + \omega_0^2 = 0 \tag{16}$$

wherein:
s is the characteristic frequency of transient motion, and
$\omega_0$ is defined in Equation (1), being equal to $$(PA^2/mV_s)^{\frac{1}{2}} \tag{17}$$

That embodiment currently disclosed with the aid of FIGS. 1 to 3 and Equation (16) has significant design and operational advantages, since it unifies the volumes of chambers 23 and 123 into a spring volume pursuant to Equation (1), thereby obviating the traditional external damping chamber, and since it operates pursuant to a second-order equation, such as Equation (16), which is less complicated than the third-order Equation (2) of traditional vibration isolators. According to a preferred embodiment of the invention, the pneumatic vibration isolation system 10 or 100 is provided with a pneumatic fluid compliance volume including a damping volume in the pneumatic fluid chamber 23, such as disclosed above, with "compliance volume" being in effect the spring volume, as explained above.

In this respect, it may be considered that vertical damping in each module 12 to 15 or isolator 100 is caused by the pressure rise across the flow restrictor 51 due to vertical movement of diaphragm 18. The greater the pressure drop for a given flow, the greater the damping force.

The efficiency of the damping restrictor can be defined by the ratio of the initial volume between (a) the diaphragm 18 and the walls of the fluid chamber 23 before the stroke to (b) the final volume therebetween after the stroke (V1/V2), and should be as high as a figure as possible. For vibrations that produce only small strokes, the only way to obtain a high compression ratio is by reducing the initial volume (V1) as much as practical. In this case, the volume can be as small as permitted by the stroke and side motion of the diaphragm 18, and the bottom and side of the first pneumatic chamber 23 are preferably constructed to these limiting dimensions, allowing for a reasonable tolerance, such as the ten percent tolerance mentioned above. By way of example, if a typical gas volume of the first pneumatic chamber 23 in FIGS. 2 and 3 is 400 cm³ before the stroke of the diaphragm 18, and is 200 cm³ after its maximum stroke, this yields a compression ratio of approximately two (400/200), which is much better than compression ratios on the order of 1.00 which are typical for vibration isolators such as those described in Dr. DeBra's above mentioned paper.

For ease of manufacture, assembly and servicing, each isolator module 12 to 15 may be composed mainly of matching or mating halves or main parts 84 and 85 forming internal pneumatic chambers 23, 123, etc. when held together with fasteners 86.

The diaphragm 18 may be held in place at a circumferential portion thereof around its compliance section 26 by an apertured mount or clamp 41 which defines a stop 87 at a control aperture through which the diaphragm support 31 extends with clearance. That diaphragm clamp ring 41 is held in place by fasteners 42, already mentioned above.

According to the illustrated preferred embodiment of the invention, the inside wall of the smaller fluid chamber 23 is shaped frustoconically, or is frustoconical, in the same sense as bell-shaped diaphragm 18, or the diaphragm with catenary side 28, is substantially frustoconical. This complementary configuration of diaphragm 18 and fluid chamber 23 represents a big step in the direction of minimizing the internal or effective volume of the pressure chamber as further mentioned above ahead of Equation (10) and again after Equation (17) above.

That may be further realized by limiting the maximum possible travel of the stiffened diaphragm portion 27 so that it can travel as close as possible to the smaller-diameter top of the substantially frustoconical fluid chamber 23 in FIG. 2 or to the smaller-diameter bottom or fluid restrictor 51 in FIG. 3, given a reasonable tolerance, such as ten percent of vertical travel, beyond the maximum travel of stiffened diaphragm portion 27 for maximum vibration isolation and for self-centering preparatory to vibration isolation, such as presently described.

In particular, the diaphragm support extension has a self-centering platform or foot 91 attached to the diaphragm support 31 by a fastener 92, and made of two parts to permit installation thereof so that the stop 87 of diaphragm clamp ring 41 is between curved stop surfaces 94 and 95 of that self-centering platform or foot 91.

The curved surface 94 cooperates with a curved surface 97 of the diaphragm clamp 41 to provide a stop for diaphragm travel in one direction, and to self-center the diaphragm 18 and diaphragm mount 31 as the pneumatic chambers 23 and 123 are being deflated, such as by operation of the pressure regulator 54 when the gas supply 53 is shut off. This self-centering in the rest position of the equipment assists in readying the pneumatic vibration isolator for action, when the chambers 23 and 123 are reinflared, such as upon activation of the gas supply 53.

The self-centering platform or foot 91 also has an outwardly curved section 95 adapted to cooperate with the stationary stop 87 of the diaphragm clamp 41 to delimit travel of the diaphragm 18 in a direction opposite to the direction in which diaphragm travel is delimited by the platform or foot section 94. Due to its curvature and location, the other foot section 95 automatically centers the diaphragm 18 upon initial inflation of the pneumatic vibration isolator 100 or isolator modules 12 to 15.

In this respect, the pressure regulator 54 may be adjusted so that each pneumatic isolator 100 or isolator module inflates fully, before the somewhat inert level control valve 65 or 165 starts leveling the platform 10 or table structure 120 to its desired height, as determined by the setting of the level adjustment 76, for instance. Accordingly, before the level control valve 65 or 165 initiates its operation, the diaphragm with diaphragm support 31 are self-centered preparatory to a leveling of the platform 10 or table structure 120. This at once improves the performance of all diaphragm/fluid chamber assemblies of the isolation structure and thereby the entire pneumatic vibration isolation process.

However, it is mainly the novel diaphragm configuration that accounts for improved performance and design capabilities in various applications.

The following is a partial listings of applications wherein embodiments of the invention ensure reliable and accurate vibration isolations. Some of these can be performed with the kind of platform shown in FIG. 1, while others require or benefit from the use of heavy honeycomb tables and other load supporting structures well known as such in the art:

Analytical balance support, ballistic electron emission microscopy, cell manipulation, confocal microscopy, electrophysiology, fiberoptic systems, Fourier transform infrared spectroscopy, interferometry, holography, laserassisted deposition, laser chemistry, laser surgery, light microscopy, materials testing, microinjection, micropositioning, optical computing, optical inspection, optical metrology/machine vision, patch clamping, scanning electron microscopy, scanning tunnelling microscopy, surface profilometry, tunneling electron microscopy, thin-film deposition, velocimetry, video microscopy, wafer probing and inspection, wire bonding, and wherever else the highest requirements arise.

I claim:

1. In a method of isolating a load structure from vertical, horizontal and rotational vibrations of a supporting structure with the aid of displacement of a pneumatic fluid from and to a fluid chamber of a pneumatic vibration isolation system, the improvement comprising in combination:

providing a fluid-tight diaphragm extending from a circumferential edge of said fluid chamber into said fluid chamber;

providing said diaphragm with a circumferential compliance section inside said edge of the fluid chamber;

structuring said diaphragm inside of said compliance section with alternate stiffened and reinforced diaphragm portions in said fluid chamber;

coupling said diaphragm and said fluid chamber between said supporting structure and said load structure;

damping vertical vibrations by displacing pneumatic fluid from and to said fluid chamber with said fluid-tight diaphragm; and damping horizontal and rotational vibrations with said reinforced diaphragm portion in said fluid chamber.

2. A method as in claim 1, wherein:

an initial structure of the structured diaphragm is substantially maintained with said stiffened diaphragm portions, except for variations due to and during damping of vibrations with said alternate stiffened and reinforced diaphragm portions.

3. A method as in claim 1, wherein:

said structuring includes imposing a catenary shape on the reinforced diaphragm portion for damping horizontal and rotational vibrations in said fluid chamber; and maintaining said catenary shape of the reinforced diaphragm portion with said stiffened diaphragm portions, except for variations due to and during damping of vibrations with said alternate stiffened and reinforced diaphragm portions.

4. A method as in claim 1, wherein:

said structuring includes imposing on said diaphragm a bell shape having a circumferential rim inside of said circumferential compliance section established and maintained by one of said stiffened diaphragm portions, and having a central portion established and maintained by another stiffened diaphragm portion, and having the reinforced diaphragm portion for damping horizontal and rotational vibrations located between said one and said other stiffened diaphragm portions; and said diaphragm is coupled to one of said load structure and said supporting structure via said central portion of the diaphragm.

5. A method as in claim 1, wherein:

said coupling includes providing a diaphragm support for stiffening a central portion of said diaphragm;

said diaphragm support is extended from said central portion inside said fluid chamber and past said circumferential edge to an outside of said fluid chamber for coupling said diaphragm to one of said load structure and said supporting structure.

6. A method as in claim 5, wherein:

said reinforced diaphragm portion for damping horizontal and rotational vibrations is structured around and circumferentially spaced from said diaphragm support.

7. A method as in claim 5, wherein:

said reinforced diaphragm portion for damping horizontal and rotational vibrations is structured around and is maintained circumferentially spaced from said diaphragm support with a stiffened annular portion of the diaphragm inside of said circumferential compliance section.

8. A method as in claim 5, wherein:
said diaphragm is draped over said diaphragm support at said central portion of said diaphragm, with the reinforced diaphragm portion for damping horizontal and rotational vibrations extending in circumferentially spaced relationship to said diaphragm support, but inside of said circumferential compliance section.

9. A method as in claim 8, wherein:
a stiffened diaphragm section is interposed between said circumferential compliance section and said reinforced diaphragm portion for damping horizontal and rotational vibrations.

10. A method as in claim 1, wherein:
said pneumatic vibration isolation system is provided with a pneumatic fluid compliance volume including a damping volume in said fluid chamber.

11. In apparatus for isolating a load structure from vertical, horizontal and rotational vibrations of a supporting structure with the aid of displacement of a pneumatic fluid from and to a fluid chamber of a pneumatic vibration isolation system, the improvement comprising in combination:
a fluid-tight diaphragm extending from a circumferential edge of said fluid chamber into said fluid chamber;
said diaphragm having a circumferential compliance section inside said edge of the fluid chamber;
said diaphragm having a vertical vibrations damping section and a horizontal and rotational vibrations damping section inside of said compliance section in the form of alternate stiffened and reinforced diaphragm portions in said fluid chamber; and
said diaphragm and said fluid chamber adapted to be coupled between said supporting structure and said load structure;
whereby vertical vibrations are dampened by displacing pneumatic fluid from and to said fluid chamber with said diaphragm including said stiffened diaphragm portion of said vertical vibrations damping section, and horizontal and rotational vibrations are dampened with said reinforced diaphragm portion including said horizontal and rotational vibrations damping section in said fluid chamber.

12. Apparatus as in claim 11, wherein:
said horizontal and rotational vibration damping section includes a reinforced diaphragm portion of a catenary shape.

13. Apparatus as in claim 11, wherein:
said diaphragm has a bell shape including a circumferential rim inside of said circumferential compliance section at one of said stiffened diaphragm portions, and including in said vertical vibrations damping section a central stiffened diaphragm portion, and having the reinforced diaphragm portion located between said central portion and said circumferential rim; and
said diaphragm coupled to one of said load structure and said supporting structure via said central portion of the diaphragm.

14. Apparatus as in claim 11, wherein:
said vertical vibrations damping section includes a diaphragm support extending from a central portion of said diaphragm inside said fluid chamber and past said circumferential edge to an outside of said fluid chamber and being adapted to couple said diaphragm to one of said load structure and said supporting structure.

15. Apparatus as in claim 14, wherein:
said horizontal and rotational vibrations damping section includes a reinforced diaphragm portion around and circumferentially spaced from said diaphragm support.

16. Apparatus in claim 15, wherein:
said diaphragm includes a stiffened annular portion inside of said circumferential compliance section.

17. Apparatus as in claim 11, wherein:
said horizontal and rotational vibrations damping section includes a stiffened diaphragm section between said circumferential compliance section and a reinforced diaphragm portion.

18. Apparatus as in claim 11, wherein:
said pneumatic vibration isolation system defines a pneumatic fluid compliance volume including a damping volume in said fluid chamber.

19. In apparatus for isolating a load structure from vertical, horizontal and rotational vibrations of a supporting structure with the aid of displacement of a pneumatic fluid from and to a fluid chamber of a pneumatic vibration isolation system,
the improvement comprising in combination: a diaphragm support extending from outside said fluid chamber and past a circumferential edge of said fluid chamber into said fluid chamber;
a fluid-tight diaphragm extending from said circumferential edge of said fluid chamber onto said diaphragm support in said fluid chamber;
said fluid-tight diaphragm having an annular compliance section at said circumferential edge; and
said diaphragm including a reinforced diaphragm portion around and in spaced relationship to said diaphragm support and inside of said annular compliance section;
said diaphragm having an annular stiffened diaphragm portion between said reinforced diaphragm portion and said annular compliance section.

20. Apparatus as in claim 19, wherein:
said reinforced diaphragm portion has a catenary shape.

21. A method as in claim 1, wherein:
said fluid chamber is provided around said fluid-tight diaphragm.

22. A method as in claim 1, wherein:
said fluid-tight diaphragm has an inside open to atmosphere.

23. A method as in claim 1, wherein:
said fluid chamber is provided with a wall encompassing said fluid-tight diaphragm; and
said wall is spaced all around said alternate stiffened and reinforced diaphragm portions.

24. Apparatus as in claim 11, wherein:
said fluid-tight diaphragm is inside said fluid chamber.

25. Apparatus as in claim 11, wherein:
said fluid-tight diaphragm has an inside open to atmosphere.

26. Apparatus as in claim 11, wherein:
said fluid chamber has a wall encompassing said fluid-tight diaphragm and spaced all around said fluid-tight diaphragm in said fluid chamber.

27. Apparatus as in claim 19, wherein:
said fluid-tight diaphragm is inside said fluid chamber.

28. Apparatus as in claim 19, wherein:
said fluid-tight diaphragm has an inside open to atmosphere.

29. Apparatus as in claim 19, wherein:
said fluid chamber has a wall encompassing said fluid-tight diaphragm and spaced all around said fluid-tight diaphragm in said fluid chamber.

* * * * *